March 25, 1924.  W. L. McGRATH  1,488,127
ENGINE STARTER
Filed March 20, 1919   2 Sheets-Sheet 1

March 25, 1924.

W. L. McGRATH 1,488,127

ENGINE STARTER

Filed March 20, 1919    2 Sheets-Sheet 2

Witnesses
Martin H. Olsen
Robert Dobberman

Inventor
William L. McGrath
By Rector, Hibben, Davis & Macauley
His Attys.

Patented Mar. 25, 1924.

1,488,127

UNITED STATES PATENT OFFICE.

WILLIAM L. McGRATH, OF ELMIRA, NEW YORK, ASSIGNOR TO ECLIPSE MACHINE COMPANY, OF ELMIRA, NEW YORK, A CORPORATION OF NEW YORK.

ENGINE STARTER.

Application filed March 20, 1919. Serial No. 283,778.

*To all whom it may concern:*

Be it known that I, WILLIAM L. McGRATH, a citizen of the United States, residing at Elmira, in the county of Chemung and State of New York, have invented certain new and useful Improvements in Engine Starters, of which the following is a specification.

My invention relates to the drive or transmission portion of an engine starter, and the object thereof is to provide a simple, efficient and reliable construction of drive more particularly adapted for hand operation as distinguished from power operation through a starting motor, although such construction is capable of operation by either hand or power. The various features of advantage and utility in the construction and operation of my form of drive will be apparent from the description hereinafter given.

Figure 1:
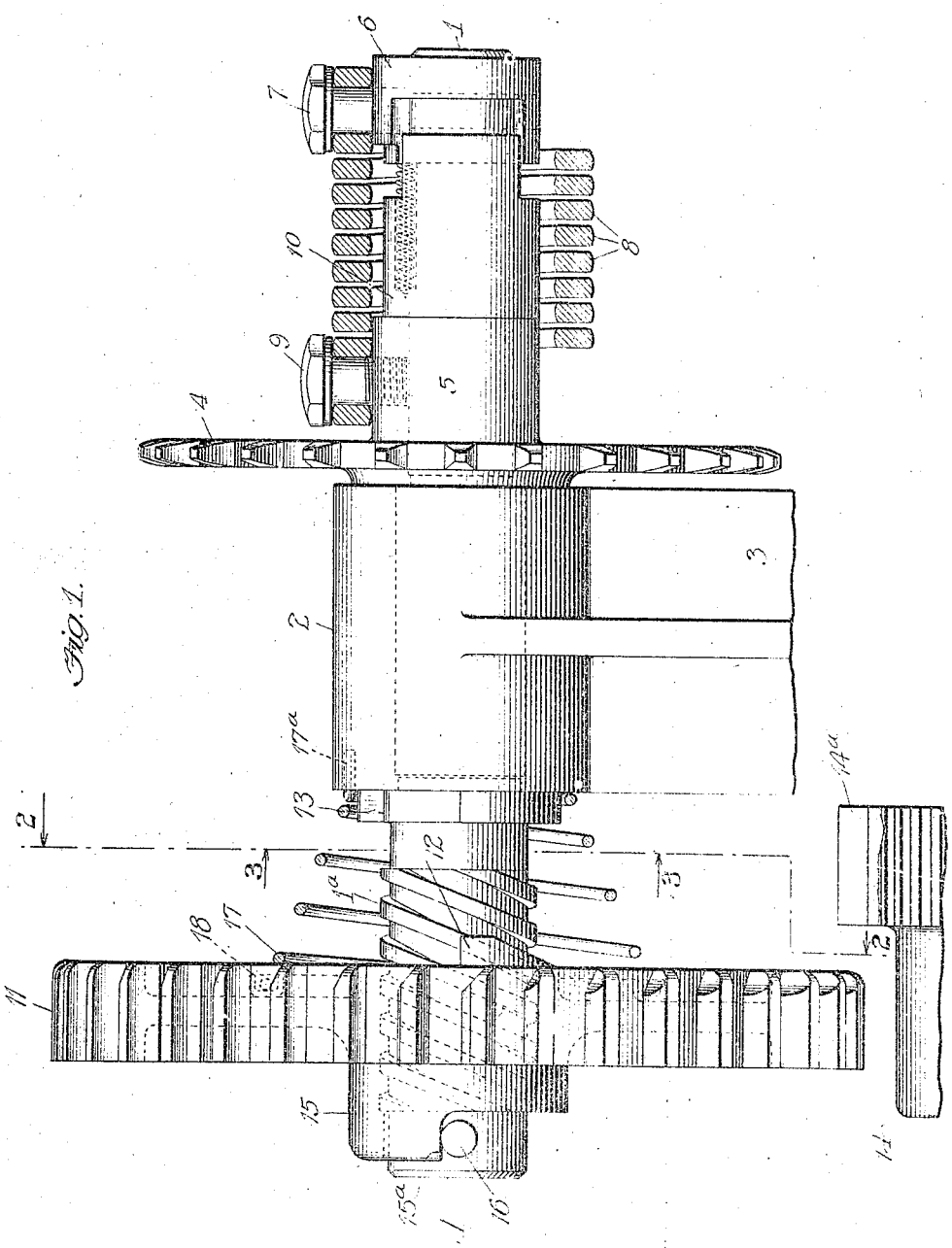
Figure 2:
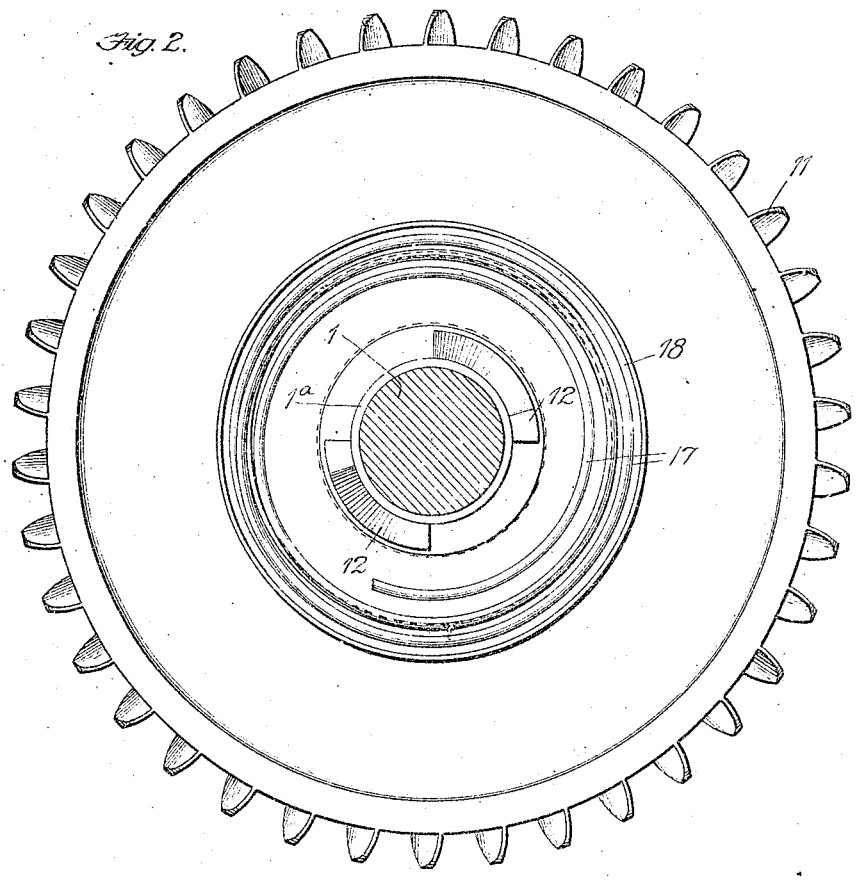
Figure 3:
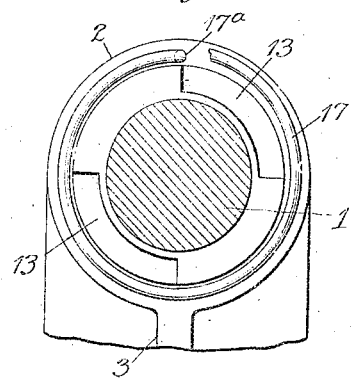

In the drawings, Fig. 1 is an elevation partly in section of a drive embodying my invention, and Figs. 2 and 3 sections on the correspondingly indicated section lines of Fig. 1.

Referring to the particular embodiment of my invention herein illustrated, the drive comprises a rotatable shaft 1 having plain portions and also a screw threaded portion 1ª and the same is mounted intermediate its length in a suitable bearing 2 on a bracket 3. This bearing serves as the only bearing for the drive and takes all loads, both torque and pressure. Loosely mounted on this shaft is a driving wheel which is here in the form of a sprocket wheel 4 which has a laterally extended hub 5. To the outer end of the shaft 1 there is secured a driving head 6 by means of the pin or bolt 7. The hub 5 and head 6 are operatively connected by a yielding driving connection which is here in the form of a coiled spring 8 whose ends are anchored to the bolts 7 and 9 respectively. Between this hub 5 and head 6 there is a sleeve 10 mounted on the shaft 1 and separate from such hub. This sleeve and the head 6 have complementary lugs and recesses and the construction and arrangement are such that a limited endwise movement of the shaft 1 and head 6 with relation to the hub 5 and sleeve 10 will be permitted in the event that the pinion teeth and flywheel teeth should abut end to end as hereinafter described.

Upon the screw threaded portion of the shaft there is mounted a large pinion or gear 11, capable of a longitudinal movement on the shaft and rotary movement therewith. This gear is provided on its inner side and towards its center with one or more clutch jaws 12 adapted to engage and cooperate with corresponding clutch jaws 13 formed on the shaft 1 at a point adjacent the bearing 2. When the shaft 1 is rotated the gear 11 will be automatically advanced longitudinally toward the right and into engagement with the teeth 14ª of the rotatable engine member 14 which is here the flywheel. When full mesh has been attained the clutch jaws 12 and 13 are in driving engagement and the gear and consequently the flywheel will be driven by the shaft 1.

When the engine starts on its own power the gear 11 will be automatically demeshed and returned to normal position shown in the drawings, at which time the shoulder portion 15ª of the hub 15 of the gear will be in contact with a pin 16 in the shaft, such pin acting as a stop for the backward movement of the gear.

In order to prevent any creeping of the gear towards engaging position, a spring 17 is interposed between the bearing 2 and the gear. This spring is a very light one, sufficient to prevent such creeping but insufficient to prevent the desired longitudinal movement of the gear when the drive is operated. This spring is of the conical spiral type with the base coil seated in a retainer or groove 18 in the gear and with its inner end 17ª anchored in one side of the bearing 2. The larger end of this spring bears frictionally against its gear and therefore assists in the meshing operation because it thereby prevents rotation of the gear at the time when it should move longitudinally of the shaft.

In the event that the teeth of the gear and the flywheel should abut end to end as a result of the longitudinal movement of such gear and while the shaft 1 is rotating, such shaft will yield or slide through the bearing 2 towards the left against the tension of the spring 8, and at the same time the gear 11 will be momentarily stopped and caused to rotate slightly so as to bring said teeth into proper register for meshing.

I claim:

1. In a device of the class described, the combination of a rotatable shaft having a single bearing which takes all torque and pressure loads, a gear mounted on said shaft at a point adjacent one end of said bearing and arranged to apply a rotative power to one end portion of said shaft, a driving member mounted on the other end portion of the shaft for longitudinal movement thereon and rotary movement therewith and adapted to cooperate with a part of the engine to be started, said shaft and driving member having engaging means at a point adjacent the other end of such a bearing and coacting at the end of the inward longitudinal movement of the driving member towards said bearing.

2. In a device of the class described, the combination of a rotatable shaft having a single bearing which takes all torque and pressure loads, a gear mounted on said shaft at a point adjacent one end of said bearing and arranged to apply a rotative power to one end portion of said shaft, a driving member mounted on the other end portion of the shaft for longitudinal movement thereon, and rotary movement therewith, and adapted to cooperate with a part of the engine to be started, said driving member having a groove element on one side and the shaft having at a point adjacent said bearing a groove member adapted to be engaged by the first named groove member at the end of the longitudinal movement of the driving member inwardly towards said bearing.

3. In a device of the class described, the combination of a rotatable member having a substantially central bearing, means for applying rotative power to one end portion of such member, and a gear mounted on the other end portion of the member for longitudinal movement thereof and rotary movement therewith, and a conical spiral spring, secured at its smaller end to the bearing and frictionally bearing at its other or larger end against the gear.

4. In a device of the class described, the combination of a rotatable shaft having a substantially central bearing, a driving wheel mounted on one end portion of the shaft at a point adjacent one end of said bearing, a yielding driving connection between such shaft and wheel, and a gear mounted on the other end portion of the shaft for longitudinal movement inwardly thereof towards the other end of said bearing and for rotary movement therewith, said shaft and gear having cooperating clutch means.

5. In a device of the class described, the combination of a rotatable shaft having a substantially central bearing, a driving wheel mounted on one end portion of the shaft at a point adjacent one end of said bearing, a yielding driving connection between such shaft and wheel, comprising a coiled spring anchored respectively to the driving wheel and shaft, and a gear mounted on the other end portion of the shaft for longitudinal movement inwardly thereof towards the other end of said bearing and for rotary movement therewith, said shaft and gear having cooperating clutch means.

6. In a device of the class described, the combination of a rotatable shaft having a substantially central bearing, a driving wheel mounted on one end portion of the shaft at a point adjacent one end of said bearing and adjacent the bearing and having a hub, a spring driving connection between such hub and shaft, and a gear mounted on the other end portion of the shaft for longitudinal movement inwardly thereof towards the other end of said bearing and for rotary movement therewith, said shaft and gear having cooperating driving means.

WILLIAM L. McGRATH.